United States Patent
Buck et al.

[15] 3,653,908
[45] Apr. 4, 1972

[54] ANIMAL FOOD PRODUCT AND PROCESS

[72] Inventors: Marvin E. Buck; Brian W. Smith, both of Battle Creek, Mich.

[73] Assignee: General Foods Corporation, White Plains, N.Y.

[22] Filed: June 6, 1969

[21] Appl. No.: 789,400

Related U.S. Application Data

[63] Continuation-in-part of Ser. No. 696,155, Jan. 8, 1968, abandoned.

[52] U.S. Cl..............................................99/2, 99/7, 99/108
[51] Int. Cl..........................................A23k 1/00, A23k 1/10
[58] Field of Search.....................................99/2, 108, 7, 109

[56] References Cited

UNITED STATES PATENTS

| | | | |
|---|---|---|---|
| 3,115,409 | 12/1963 | Halliman et al. | 99/7 |
| 3,202,514 | 8/1965 | Burgess et al. | 99/2 |
| 3,365,297 | 1/1968 | Burgess et al. | 99/2 |
| 3,391,006 | 7/1968 | Sair et al. | 99/159 |
| 3,391,007 | 7/1968 | Sair et al. | 99/159 |
| 3,438,780 | 4/1969 | Singer | 99/2 |
| 3,482,985 | 12/1969 | Burgess et al. | 99/2 |
| 3,489,574 | 1/1970 | Du Puis | 99/150 |
| 3,506,455 | 4/1970 | Savage et al. | 99/108 |
| 3,512,993 | 5/1970 | Conley et al. | 99/108 |

*Primary Examiner*—Norman Yudkoff
*Assistant Examiner*—Curtis P. Ribando
*Attorney*—Coleman R. Reap, Bruno P. Struzzi and Thomas V. Sullivan

[57] ABSTRACT

Extrusion cooling of pasteurized meat slurry containing ungelatinized amylaceous material and preferably proteinaceous extracts produces a shelf stable 35–45 percent moisture extrudate that is shape retaining; sugars, alcohols, salts and acidulants serving to provide bacteriostasis.

14 Claims, No Drawings

ANIMAL FOOD PRODUCT AND PROCESS

This application is a Continuation-in-Part of application Ser. No. 696,155, filed Jan. 8, 1968, now abandoned.

This invention relates to an intermediate moisture feline food of enhanced palatability and prolonged shelf stability; more particularly the invention is concerned with a process for manufacturing such food which can be advantageously offered to pet owners in a form which is aesthetically attractive, convenient to feed and store without refrigeration and microbially stable and which can be readily manufactured.

Moisture contents are expressed hereinafter will refer in all instances unless reference to the contrary appears to the percent moisture calculated as a weight percent of moisture in product just prior to packaging thereof, moisture being measured by a direct oven method wherein specimens are weighted before and after desiccation for sixteen hours in an oven at 100° F.

Commercial canned catfood having a moisture content of 70–75 percent offers the pet a desirably soft, moist and palatable product which offers taste and nutritional benefits. Canned versions of feline foods in various flavors represent the most commonly accepted and successful form of catfood now sold. Such a product, however, does not offer to the consumer a moist food which is conveniently opened from its packaged form and which, when opened, is readily served to the pet; it would be desirable to market such a product requiring no refrigeration during storage and offering a tasty, soft-moist character in easy to eat bite-size pieces which can be packaged in convenient individual serving packets and which advantageously do not require refrigeration of the unused portion. Such a product should lend itself to the formulation of a variety of feline foods which may contain either fresh fish, chicken or liver, for instance, and which may desirably also have added thereto the vitamins, minerals and other nutrients essential to a balanced ration.

The formulation of such a feline food of acceptable palatability to the cat or like pet represents a considerable challenge to the man skilled in art. Cats are notorious for their unpredictable eating habits; in a word, they're finicky. In large measure this dimension in catfood palatability is directly related to the ability of the product to contain a significant amount of water since it appears that water liberates those organoleptic aroma and flavor values which render a catfood palatable. Canned catfoods are eminent in this respect and it appears that meaty rations at a 70–75 percent moisture offer to the pet a product having overall acceptability. Dry catfoods in a pellet or other meal form and adapted to be wetted to a high moisture level also offer the feline taste and aroma values which are acceptable but they fall short of the acceptability of a canned product.

A product approaching the palatability of canned catfood and which meets the above marketing objectives would be preferred, but this presents a difficult stability target. A palatable, moist catfood having none of the disadvantages of a canned product, i.e. one which can be readily manufactured without the need for commercial sterilization and expensive canning technology generally in a readily openable container, which does not require refrigeration either before, during or after partial use and which is readily dischargeable from the package has long been desired. This problem has presented a dichotomy, for as one increases the moisture content of the catfood formulation much above 15 percent and significantly above 30 percent whereat catfood acceptability is enhanced, there is a corresponding difficulty in providing bacteriostasis and overall protection against microbial spoilage. Felines significantly prefer a formulation containing fish, liver or chicken, for instance, and having a moisture content in the neighborhood of, say, 35–45 percent in comparison to a corresponding formulation in meal form but adapted to be wetted; however, a formulation at the 35–45 percent moisture level adapted to be stored without refrigeration requires a microbial stability system which has heretofore eluded those skilled in the art of food preservation.

Prior art workers concentrating on other quadrupeds such as dogs, to wit Burges et al., U.S. Pat. No. 3,202,514 issued Aug. 24, 1965 for "Animal Food and Method of Making the Same" advanced the art of cold packing a nutritionally balanced animal food of good acceptability when such product is of a 15–30 percent moisture. This advance involved the recognition that sugars as a principal constituent of the solute phase of a stabilizing solution of high osmotic pressure desirably allowed a matrix of nutritionally balanced meat and vegetable materials to be pasteurized and thereafter readily converted by shaping and other material handling at sub-pasteurization temperatures into package form. However, such formulations at moisture levels in excess of 30 percent are quite prone to undergo microbial instability. Addition to such formulations of acids, such as offer an increased hydrogen-ion concentration, serve to enhance bacteriostasis to some degree. However, most such food formulations at a 35–45 percent moisture, even when they contain an added antimycotic such as a sorbic acid compound, cannot be cold packed. The problem of providing a stable and yet moist catfood is further compounded by the rheological characteristics of the composition, for as a product formulation is increased above 35 percent, the composition takes on a more fluid, semi-solid characteristic which is undesirable when the food is to be presented to the animal in individual pellets or other forms. Cats consume their rations by mechanical grasping and free oral manipulation. Increasing the sugar level for bacteriostasis to too great an extent imparts a stickiness to a semimoist composition. A cat is not equipped to consume a sticky, gummy-textured product.

Briefly stated, the present invention involves the formulation of a feline ration containing meaty material, to be hereinafter described, containing therein a bacteriostatic amount of stabilizing solutes from the class sugars, polyhydric alcohols, food acidulants and salts and at least about 5 percent amylaceous material which has been gelatinized incident to converting the ration's meaty matrix forming materials from a pasteurized slurry to a shapeable thermoplastic composition. The process involves agitating this slurry at a commercial sterilizing temperature or above for a substantial period sufficient to at least pasteurize the meaty constituent therein and thereby induce the requisite thermal kill and then micropulverizing and emulsifying the slurry; adding said solutes and ungelatinized starchy materials to the slurry and agitating in a confined zone of high pressure until the starch content has been gelatinized (measured by a substantial loss of birefringence in the final product); issuing the ration from said zone in the form of shaped extrudate having a moisture content of 35–45 percent; and cooling the extrudate to set the shape so-produced.

The extrudate may be pelletized or otherwise handled preparatory to packaging and advantageously can be allowed to cool to ambient condition and is thereafter loosely packed in suitable packaging material which is preferably substantially hermetic to retain product moisture and thereby maximize product palatability. The so-packaged composition is possessed of a number of significant product advantages, not the least of which is its micro-organic stability when stored without refrigeration for long periods in the order of 12 months and when subjected to varying climatic conditions representing national distribution. Despite the presence of a significant amount of moisture in the product the aqueous phase thereof does not undergo separation and the product itself retains a desirable particulate form, the product being essentially shape-retaining and thus lending itself to natural cat-eating habits. The thermoplastic composition in extrudate form can be readily manipulated using comparatively unsophisticated plant practices and eliminates entirely the necessity for any commercial sterilization techniques such as are dictated for the manufacture of canned catfood, thereby introducing manufacturing and packaging economy.

These advantages all accrue by including about 5 to 20 percent raw starch or other ungelatinized amylaceous material in the aforesaid ration preparatory to what is essentially a hot extrusion; the consequent conversion of the starch to a gelatinized form and the ensuing extrusion of this matrix provides an extrudate that is shape-retaining upon cooling. The hot extrudate develops a sheet upon issuance from the extruder and an overall appearance, texture and mouthfeel akin to a more moist product. The product has a micro-cellular spongiform structure upon extrusion which does not collapse. The product is not sticky despite the presence therein of a significant amount of dissolved stabilizing sugars which are essentially present at a level exceeding 10 percent. The product has a meaty appearance suggestive of high protein meat cuts; it is characterized by a high degree of homogeneity of the meat phase of the ration as well as the stabilizing solute and moisture phase. Under manipulation in plant practice the extrudate does not fragment or crumble and can be predictably metered into automatic packaging equipment. When the package is opened, the individual bite-sized form desired is retained and the individual servings can be readily discharged from the opened package in a thoroughly predictable manner.

All of the foregoing product characteristics are best achieved in a most preferred embodiment of the invention by also employing in combination with the ungelatinized starch a level of proteinaceous concentrate such as dried nonfat milk solids, sodium caseinate, water soluble extracts or concentrates of soybean and other protein meal extracts of animal or vegetable origin such as vegetable protein extracts or peanut, cottonseed and the like, fish meal extracts, bovine-derived blood and gelatin. Usually the proteinaceous meatbinder is employed at a level less than the level of ungelatinized starch in the ration. The preferred level of ungelatinized starch in the ration will vary in accordance with the desired texture, which in turn is dependent upon the moisture and the choice of meats used in the ration. Generally, however, the level of ungelatinized starch will exceed 5 percent of the composition of the final product as packaged. A typical level of the ungelatinized starch containing material incorporated in the ration will be 6–7 percent raw cornflour and a like amount of ground oatflour which taken with the other starch content of the raw materials of the ration will result in a level in the order of 12–13 percent.

The animal ration will desirably contain as an essential, principal ingredient thereof a highly subdivided feline-preferred meat, typically a fish such as tuna or a variety of ocean fish, chicken, beef liver, beef kidney and beef by-product. The level of such comminuted meat or meat by-product in the product will by-product from 10–50 percent, more commonly, 40 percent.

The total level of stablilizing solutes, principal as a weight percent of which will be sugar, will be at least 15 percent of the finished composition, generally 20–35 percent and the preferred sugar will be one high in dextrose, e.g., 15 percent dextrose. A typical range of sugar solutes will exceed 10 percent and range up to about 30 percent. Preferably the sugar will be high in glucose content, it being found that felines are less attracted to sweet sugars such as sucrose. Among the balance of solutes of use will principally be polyhydric alcohols and salts to be hereinafter illustrated. The term sugar as it is employed in the present context is the same context as is set forth in Burges et al., U.S. Pat. No. 3,202,514 and the definition of the term therein is coextensive with the term as it is to be understood herein. Thus, the term "sugar" embraces water soluble monosaccharides and the reducing and non-reducing polysaccharides and their degradation products. In general, the sugar should be of a low enough molecular weight so as to offer a substantial effect in increasing the osmotic pressure of the sugar solution infusing the ration matrix material.

The term "polyhydric alcohol" is understood to include those di-and trihydric sugar alcohols typified by glycerol and sorbitol. For most feline rations, however, the level of use of such polyhydric alcohol will be necessarily low since many polyhydric alcohols and particularly propylene glycol are not preferred by the felines. A common range of use of polyhydric alcohol, therefore, will be 0–12 percent, preferably 5–10 percent.

Of major functionality to the microbial stability of the present system will be the use of a food grade acidulent such as phosphoric, tartaric, malic, citric, fumaric, hydrochloric and the like edible food acids which offer a hydrogen-ion acidulating effect and results in the adjustment of product pH downward from a neutral level to 4–5.5, although even lower pH's as well as higher may be practiced. The use of some food grade acidulents in any event is essential to providing bacteriostasis in the present system. A second functional adjunct to the sugar or sugar alcohol is salt, which like sugar offers a great influence in increasing the osmotic pressure in the aqeous solution using the matrix material. Sodium chloride, sodium citrate and calcium chloride are representative of the group of mono-, di- and trivalent salts of organic and inorganic acids that may be used. The range of use of salts will be 0.5–6 percent, it being found that in most applications the use of some levels of salt will be preferable to providing overall microbial stability; the use of a salt level, say above 2 percent, will not be essential, particularly when a sufficiently high level of other stabilizing solutes are also present at levels in excess of 20 percent by weight of the composition.

By reason of the high level of moisture in the formulation an antimycotic such as sorbic acid compounds like potassium sorbate or sorbic acid itself will be employed in the composition. Other useful antimycotics known to those skilled in the art are propionic, benzoic, and crotonic acids and like antimycotics. A sorbic acid compound serves not only as an antimycotic but also as a bacteriostat, it being found that a sorbic acid compound provides a definite beneficial effect in complementing that of sugar and other solutes used. Generally, the level of sorbic acid compound used will not exceed 1 percent and will be in the neighborhood of 0.3 to 0.5 percent.

The composition will, as indicated previously, also contain a gelatinized starch preferably in combination with a proteinaceous meatbinder. The use of such adjuncts in colloidal dispersion throughout the pasteurized matrix of hot extruded rations is believed to assist in the stabilization of the ration against microbial decomposition, particularly in those rations whose stabilities are highly stressed due to the comparatively reduced level of solutes and the high level of moisture, particularly at levels in excess of 40 percent. It is believed that the gelatinized starch and, where used, the proteinaceous extract serve to so stabilize the product's rheological stage that the solutes therein are discretely dispersed in intimate association with the comminuted meat portion of the ration so as to predictably and faithfully thereby offer shelf stability thereto.

It is well known that felines prefer a food composition containing a substantial amount of moisture. We have found that by raising the fat level a reduced moisture product can be made which is very palatable to felines. Accordingly the products of the invention will desirably contain about 4 to 15 percent and preferably about 6 to 10 percent by weight fat. If the natural fat content of the materials being used to formulate the product is insufficient to provide the desired fat level, additional fatty materials can be added to supplement the natural fat. Typical of the fatty material which can be added to the composition are tallow, lard, poultry fat, etc.

The processing aspects of the present invention generally will call for the slurry cooking of meats, fats and all liquid ingredients either together with but preferably preceding addition of the stabilizing solutes. Slurry cooking is continued to achieve a slurry temperature of 180° F or higher and preferably one in excess of 200° F by which time the slurry will be in a liquefied state. In a preferred embodiment the slurry is heated until boiling occurs and it is then held above about 200° F for about 30 to about 120 minutes. The slurry is then caused to be micropulverized and emulsified so as to yield a desired small particle size and emulsification of the ingredients. The slurry will assume a thick, viscous consistence that is flowable and can be accurately metered. To the emulsified slurry will be added the raw starch constituents and preferably, also, the protein binders together with the major stabilizing solutes as well as other edifying and characterizing ingredients such as the food dyes and flavors as well as antimycotics. The finished slurry will be maintained at an elevated temperature in excess of 160° F during extrusion cooking and will be intimately mixed under violent agitation with the starch and other dry mix ingredients aforedescribed whereby with contained agitation and heating the starch will be substantially gelatinized to the point that it loses its birefringence when viewed under polarizing light. This violent and continuous agitation will be carried out typically in a continuous extrusion cooker comprising a screw-fed, steam-jacketed chamber wherein the finished slurry and the added solids combine to produce the aforedescribed thermoplastic extrudates composition, intimate mixing being performed at a sufficiently elevated temperature to assure substantially complete gelatinization, the period of extrusion cooking being of any duration depending upon the mixing ability of the equipment and typically being for about eight minutes for a Baker-Perkins continuous high-speed mixer-cooker operating at a peak cooking temperature of 250° F in the chamber of the cooker. The hot thermoplastic finished extrudate will generally be bite-size and have its smallest cross-sectional dimension ranging between one quarter and one-half-inch. Upon issuance from the extrusion orifice, the extrudate is cooled to arrest gelatinization and to "set" the extrudate in its shape-retaining form. Thus, the extrudate will preferably be deposited on a traveling wire-mesh endless conveyor belt and be subjected to a blast of cooling air whereby the extrudate will be reduced to ambient temperatures and generally to less than 100° F and preferably 80° F in as short an interval as practical, usually several minutes, by which time the product can be readily handled. Rapid cooling to retain shape definition is not essential in accordance with the present invention but is preferred in order to set the starch and best achieve the aforedescribed rheological characteristics responsible for the product advantages specified. Where shape is not as critical to product appearance, rapid cooling need not be practiced but the period of cooling should not be so prolonged as to occasion any significant reduction in moisture content below the 35 percent moisture level.

The meat emulsion entering the hot extrusion zone may have the meaty material therein in a substantially denatured or partially denatured condition and indeed it is within the ambit of the present invention that the meaty material may be substantially undenatured depending upon nutritional balance required for the feline food and also the required rheological characteristics of the hot extrudate. For many applications it will be practical to add the food grade acidulants to the meaty material slurry incident to the pasteurization, comminution or emulsification thereof and thereby partially denature or otherwise modify the meaty constituents. In other applications a base such as calcium hydroxide or sodium hydroxide may be added such as will adjust pH to above 7.0, say, 8-9 and even as high as 11 with subsequent downward adjustment after protein solubilization to a pH of 6.0 or less during such pasteurization, comminution and/or emulsification. In other applications the addition of any acids or alkalis such as will denature the meaty material of the emulsion will not be practiced and instead the meaty material will be converted to an emulsion state wherein the protein present will be substantially undenatured particularly in those formulations employing a high amount of fresh as distinguished from meat meal constituents. Similarly, a proteolytic enzyme such as contain tryptic, peptic enzymic activity or mixtures thereof may be added to the slurry prior to slurrying, comminution or emulsification, the emulsion being elevated during pasteurization and sterilization in order to activate the enzymes to effect the appropriate digestion. In many applications, a peptic, bromolytic, papaic or trypic digestion will liberate flavorful amino acids which will further impart palatability to the final product, particularly when employing reducing sugars as the stabilizing solute.

The meaty emulsion in a substantially pathogen-free condition when introduced to the hot extruding section will generally undergo further heat treatment which will not only effect gelatinization of the raw starch constituents added thereto but also will impart flavor values to the extrudate product. In those meaty emulsions containing a substantial amount of undenatured protein material the emulsion may be subjected to further temperature elevation such as will effect denaturation and coagulation of the protein material which in the hot extrudate will contribute also to the rheological characteristics of the extrudate. Similarly, the addition of a substantially undenatured meatbinder such as the aforementioned concentrated protein extracts, say, of soy bean meal which will contain globulins, glutelins and albuminoids will under the influence of sufficiently elevated temperatures also result in denaturation and coagulation in the thermoplastic composition prior to or incident to extrusion. For some applications it may be desirable to subject meaty emulsions having a substantial amount of undenatured protein to a high order of agitation such as will effect a rapid heating and substantially oriented molecular protein structure providing a fibrous character to the extrudate. Generally the addition of a requisite amount of acidulants to the meaty constituents either prior to conversion thereof into an emulsion or during hot extrusion will at least partially degrade the meaty protein material such that the coagulated condition of the thermoplastic composition will be less pronounced than would exist in that instance where acid level employed is low; it is believed that the addition of an acid at some point in the process is effective to achieve the desired homogeneity of texture.

In any event, the addition of some raw amylaceous material, which may be any one of the cereal or tuberous flours, to the hot extruder to supplement the level of amylaceous material present in the emulsion and achieve the desired rheological characteristics in the hot extrudate is essential, the level of such addition being to some degree dependent upon the level of such amylaceous material in the emulsion to begin with.

The presence of acidulants in the emulsion in the hot extrusion section together with the raw amylaceous material effects hydrolysis of the starch incident to its gelatinization to some degree, which hydrolysis effects a molecular cleavage of the starch to create some "sugar" as well as some colloids, each of which mutually contributes to the microbial stability as well as the uniformity and homogeneity of the hot extrudate.

The invention will be further described by reference to the accompanying illustrative examples.

EXAMPLE 1

| Semi-moist Catfood - Fish Flavor Ingredient | Lbs. to Produce 100 Lbs. at 37% Moisture |
|---|---|
| Fish | 18.00 |
| *Dextrose | 15.50 |
| Whole Chicken | 10.00 |
| Pork Liver | 10.00 |
| *Raw Corn Flour | 6.30 |
| *Ground Oats | 6.50 |
| Fish Meal | 4.50 |
| *Sodium Caseinate | 6.30 |
| Edible Chicken Fat | 8.50 |
| Emulsifier (Mono-and di-glyceride) | .33 |
| *Carboxymethylcellulose | 1.80 |
| *Solka-Floc (undegraded ground mercerized cellulose) | 1.80 |
| Iodized Salt | 1.50 |
| Phosphoric Acid | 1.50 |
| *Torula Yeast | .90 |
| *Potassium Sorbate | .50 |
| *Choline Chloride | .4405 |
| *Vitamin Supplement | .0726 |
| *Cobalt Sulfate | .0165 |
| *Yellow Dye | .02 |
| *Red Dye | .01 |
| Water | Balance to make 100 Lbs. |

EXAMPLE 2

Soft-Moist Catfood - Chicken Flavor

| Ingredient | Lbs. to Produce 100 Lbs. at 37% Moisture |
|---|---|
| Chicken | 30.00 |
| *Dextrose | 15.50 |
| Pork Liver | 10.00 |
| *Raw Corn Flour | 7.30 |
| *Ground Oats | 6.50 |
| Poultry Meal | 5.50 |
| *Sodium Caseinate | 5.10 |
| Animal Fat | 4.50 |
| Emulsifier | .33 |
| *Carboxymethylcellulose | 1.80 |
| *Solka Floc (undegraded ground mercerized cellulose) | 1.80 |
| Iodized Salt | 1.50 |
| Phosphoric Acid | 1.50 |
| *Torula Yeast | .90 |
| *Potassium Sorbate | .50 |
| *Vitamin Premix | .0726 |
| *Choline Chloride | .4405 |
| *Cobalt Sulfate | .0165 |
| *Yellow Dye | .0881 |
| Water | Balance to make 100 Lbs. |

EXAMPLE 3

Liver Flavor

| Ingredient | Lbs. to Produce 100 lbs. at 37% Moisture |
|---|---|
| Pork Liver | 28.00 |
| *Dextrose | 15.50 |
| Chicken | 10.00 |
| *Raw Corn Flour | 6.30 |
| *Ground Oats | 6.50 |
| Poultry Meal | 4.77 |
| *Sodium Caseinate | 6.31 |
| Edible Lard | 8.50 |
| Emulsifier | .33 |
| *Carboxymethylcellulose | 1.80 |
| *Solka Floc (undegraded ground mercerized cellulose) | 1.80 |
| Iodized Salt | 1.50 |
| Phosphoric Acid | 1.50 |
| *Torula Yeast | .90 |
| *Potassium Sorbate | .50 |
| *Vitamin Premix | .0726 |
| *Choline Chloride | .4405 |
| *Cobalt Sulfate | .0165 |
| *Iron Oxide Dyes | .2 |
| Water | Balance to make 100 Lbs. |

The formulas of Examples 1, 2 and 3 are converted to the desired semi-moist product by the following typical process wherein fish, meat, meat by-products, liver, poultry, poultry by-products may be interchanged, one for another, depending upon the formulation. Those ingredients not denoted with an asterisk in a given formulation for Examples 1 through 3 are employed to prepare a slurry. The meaty constituents of the slurry are chopped into small pieces which are then added to a mixing cooker along with emulsifiers such as mono and diglyceride, tallow, meat meals (when employed) such as poultry, fish, meat and liver, plus sorbic acid and salt. These ingredients are heated to a temperature of 212° F, and maintained at this temperature for about one hour, 15 to 20 minutes being required to elevate the constituents to this temperature, thereby effecting pasteurization and producing a liquefied slurry meat composition. The aforesaid slurry was then finely ground and passed through an emulsifier to convert it to a more or less pulpy, pumpable, flowable puree consistency. The finished emulsion was then placed into a steam-jacketed holding kettle operated with continuous agitation and maintained at a temperature of 160°-170° F.

The hot pureed form of slurry, hereinafter, referred to as the emulsion, was then proportionately blended with the remaining dry ingredients of a given formulation denoted by asterisks in the respective formulas of Examples 1 through 3, in a steam-jacketed continuous cooker wherein the slurry remained for a period of approximately eight minutes and wherein it was subjected to an elevated temperature of about 250° F converting the blend to a hot thermoplastic extrudable mass, which composition was under continuous agitation throughout the cooking. As indicated previously addition of the ingredients to the emulsion in the continuous cooker effects substantial gelatinization of the starch content thereof, sodium caseinate serving together with the oat flour and cornflour binds the proteinaceous constituents derived from the meat of the emulsion into the desired extrudable composition.

The hot extrudate in a substantially pasteurized condition issues from the continuous cooker at a temperature in the neighborhood of about 212° F with a moisture content of 40–47 percent incident to which issuance the hot extrudate undergoes flash evaporation of a very minor fraction of the moisture present. Product issuing from the continuous cooker passes a die which may be of any desired shape such as a star of a cylinder, the star shape, for instance, measuring one-quarter inch from tip to center. The extrudate is continuously subdivided to thicknesses varying from one-quarter to one-eighth inch. The extruded pellets were then immediately cooled by passing them over a cooling screen transmitting dry cool air (90 percent RH at 80° F) to an ambient temperature of 80° F at which point the product is in a form ready to be packaged. During this cooling the gelatinized material is caused to set as well as undergo some moisture loss as aforedescribed.

After the product is cooled to room temperature, it is placed on a feeding vibrator and conveyed into a vibrating, self-feeding weighing scale that weighs out 1.5 ounces of pellets which are then dumped into a conventional high-speed form and fill pouch-making machine which converts polyethylene-coated aluminum foil to a pouch and then fills and seals the formed pouch into a package, preferably one that is substantially hermetic. The product as packaged will have a moisture content of less than 45 percent. The packaged product can be subjected to the extremes of non-refrigerated storage in every representative area within the United States for a period of not less than one year without undergoing bacterial decomposition or experiencing mold or yeast growth. The product has a moist, meaty, luscious appearance and a texture that permits the product to tumble freely from the pouch as discrete pellets.

All of the foregoing catfood formulations are beneficially endowed with a comparatively high level of moisture, product softness and desirable, acceptable texture, offering the pet a semi-solid, particulate and shape-retaining particle which retains its shape throughout the packaging and other product handling both prior to and during distribution. Upon opening the package containing such product, it will desirably retain these product attributes during normal anticipated period of re-use say in the neighborhood of three weeks or less.

What is claimed is:

1. Continuous process for manufacturing a stable meat containing animal food adapted to be aerobically packaged at a moisture content of 35–45 percent which comprises comminuting meat and converting it to a pasteurized emulsified aqueous slurry; adding about 5 to 20 percent of an ungelatinized amylaceous flour, and as stabilizing solutes sugar at a level exceeding 10 percent, salt and acidulants sufficient to impart a pH of about 4 to less than about 6 whereby the osmotic pressure of said composition is sufficient to impart bacteriostasis thereto; subjecting the admixture to heat and continued agitation in a confined zone wherein the amylaceous material is substantially gelatinized and the charge material to said zone is converted to a plastic homogeneous condition and continuously issuing the hot plastic composition through a shaping orifice; and cooling the hot extrudate to ambient conditions to set the gelatinized amylaceous composition prior to packaging.

2. A process according to claim 1 wherein the fat content of the product is about 4–15 percent based on the weight of the final product.

3. A process according to claim 2 wherein said fat contains a fatty material selected from the group consisting of tallow, lard and poultry fat.

4. A process according to claim 1 wherein an undenatured protein extract is added to the slurry at a level less than the weight level of amylaceous material added.

5. A process according to claim 1 wherein polyhydric alcohol is included in the stabilizing solutes added to the slurry.

6. A process according to claim 1 wherein the extrudate has a pH less than 5.5.

7. A process of claim 6 wherein the extrudate has a pH between 5.0 and 5.5.

8. A process of claim 6 wherein the major weight percent of sugar is dextrose.

9. A process of claim 1 wherein the cooled extrudate is subdivided and packaged aerobically.

10. A process of claim 1 wherein the solutes are present at a level exceeding 10 percent and up to about 35 percent and wherein the sugar is present at a level exceeding 10 percent and up to about 30 percent of the cooled extrudate.

11. A process of claim 10 wherein the added amylaceous material comprises corn flour and the meat portion comprises 10–35 percent of the cooled composition.

12. The process of claim 1 wherein the cooled extrudate has a pH of 4 to 5.5.

13. A stable meat-containing animal food adapted to be aerobically packaged comprising comminuted meat, a substantially gelatinized amylaceous composition colloidally dispersed therein at a level of about 5 to 20% by weight of the total composition fat in an amount of about 4-15% by weight, a moisture content of 35-45% by weight, and as stabilizing solutes sugar at a level exceeding 10% by weight, salt and acidulants sufficient to impart a pH of about 4 to less than about 6 whereby the osmotic pressure of said composition is sufficient to impart bacteriostasis thereto.

14. The food of claim 13 wherein said pH is 4 to 5.5.

* * * * *